(12) United States Patent
Allen, Jr. et al.

(10) Patent No.: US 7,957,775 B2
(45) Date of Patent: Jun. 7, 2011

(54) LOW BATTERY NOTIFICATION SERVICE FOR WIRELESS DEVICE USERS

(75) Inventors: Lloyd W. Allen, Jr., Cary, NC (US);
Jana Helton Jenkins, Raleigh, NC (US);
Steven Michael Miller, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 798 days.

(21) Appl. No.: 11/934,801

(22) Filed: Nov. 5, 2007

(65) Prior Publication Data
US 2009/0117949 A1 May 7, 2009

(51) Int. Cl.
*H04B 1/38* (2006.01)

(52) U.S. Cl. .................. 455/572; 455/404.1; 455/404.2; 455/550.1; 455/573; 455/574; 455/343.2; 455/343.3; 455/343.4; 455/343.5; 455/343.6

(58) Field of Classification Search .............. 455/404.1, 455/404.2, 550.1, 572, 573, 574, 343.2–343.6
See application file for complete search history.

(56) References Cited

U.S. PATENT DOCUMENTS

| | | | | |
|---|---|---|---|---|
| 5,497,507 | A | * | 3/1996 | Komaki ..................... 455/552.1 |
| 5,726,636 | A | * | 3/1998 | Hayes, Jr. ................. 340/636.1 |
| 5,901,361 | A | * | 5/1999 | Luong ........................... 455/517 |
| 5,936,534 | A | * | 8/1999 | Yokota ....................... 340/636.1 |
| 6,236,326 | B1 | * | 5/2001 | Murphy ..................... 340/636.1 |
| 6,427,072 | B1 | * | 7/2002 | Reichelt .................... 455/404.1 |
| 6,459,896 | B1 | * | 10/2002 | Liebenow .................... 455/425 |
| 6,683,870 | B1 | * | 1/2004 | Archer ......................... 370/356 |
| 6,775,562 | B1 | * | 8/2004 | Owens et al. ................ 455/572 |
| 7,099,693 | B2 | | 8/2006 | Shin |
| 7,395,097 | B2 | * | 7/2008 | Perdomo et al. ............. 455/574 |

\* cited by examiner

*Primary Examiner* — Stephen M D'Agosta

(57) ABSTRACT

A low battery notification service is provided to a user of a wireless device capable of monitoring the voltage level of its internal battery and sending a low battery warning message. The messages are received at a service provider that maintains subscriber profiles associated with a subscriber's wireless device. When a low battery warning message is received, a wireless device identifier in the warning message is used to access a notification list included in a stored subscriber profile. Notification list entries are selected based on their assigned priorities and the existence or absence of conditions of use, permitting low battery notifications to be sent to target systems on the notification list until an acceptable response is received or the notification list is exhausted.

14 Claims, 8 Drawing Sheets

| | |
|---|---|
| 62 — Wireless Device Identifier | 64 |
| 66 — Subscriber ID | 68 |
| 70 — Override Condition 1 | 72 |
| 74 — Override Condition 2 | 75 |
| 76a — Notification Entry #1 | 78a |
| 76b — Notification Entry #2 | 78b |
| 76c — Notification Entry #3 | 78c |
| 76d — Notification Entry #4 | 78d |
| 76n — Notification Entry #n | 78e |

FIG. 3

| | |
|---|---|
| Notification Priority | 80 |
| Override Entry | 82 |
| Override Flag Set? | 84 |
| Day of Week Restrictions | 86 |
| Time of Day Restrictions | 88 |
| Group Member? | 90 |
| Group ID | 92 |
| Notification Address | 94 |
| Notification Content | 96 |
| Acceptable Response Parameters | 98 |

FIG. 4

LOW BATTERY NOTIFICATION SERVICE FOR WIRELESS DEVICE USERS

BACKGROUND OF THE INVENTION

The present invention relates to wireless devices and more particularly to a low battery warning service for users of wireless devices.

Wireless devices, such as cellular phones, personal digital assistants (PDAs), palmtop computers, laptop computers and converged combinations of such devices are now widely used and heavily depended upon for voice and data communications.

Most of the time, such devices operate using rechargeable batteries. Such batteries, of course, have to be recharged from time to time, a fact that wireless device users at least occasionally fail to remember until their wireless device fails, sometimes at an inopportune or even critical time.

Attempts have been made to deal with this problem by including low battery voltage detector circuits in wireless devices and providing audible or visual low battery warnings at the device itself. However, for various reasons, those warnings may not be seen, heard, or heeded by the device users.

It is also known for wireless devices to send low battery warning messages to pre-programmed telephone numbers selected and maintained by device users on the wireless devices themselves. The drawback of such an arrangement is that it places the entire burden of maintaining the pre-programmed telephone numbers on the wireless device user. If a wireless device user is busy, as many are, that user may fail to change pre-programmed telephone numbers if the user's working environment changes; e.g., the user goes on vacation or takes a business trip.

BRIEF SUMMARY OF THE INVENTION

The present invention may be embodied as a method of providing a low battery warning service to users of wireless devices. A low battery warning message is received through a network connecting the wireless device and the service provider. The message includes a wireless device identifier for a wireless device in which a low battery condition has been detected. A notification list associated with the wireless device identifier is retrieved. The notification list includes one or more addresses that can be notified when the low battery warning message is received. A low battery warning message is sent to one or more addresses selected from the retrieved list.

The invention may also be implemented as a computer program product for providing a low battery warning service. The computer program product includes a computer usable medium embodying computer usable program code. The computer usable program code includes code configured to receive a low battery warning message that includes a wireless device identifier for a device in which a low battery condition has been detected. The computer usable program code further includes code for retrieving a notification list associated with the wireless device identifier, code for selecting at least one notification address from the list, and code for sending a low battery notification message to each selected address.

The invention may also be implemented as an apparatus for providing a low battery warning service. The apparatus includes a subscriber profile data store that stores subscriber profiles associated with wireless devices. Each stored profile includes a notification list including at least one notification address. The apparatus also includes a receiving component for receiving a low battery warning message that identifies a wireless device in which a low battery condition has been detected. Profile identification logic identifies the stored profile associated with the identified wireless device. Access control logic reads a notification list stored in the stored profile. Notification control logic selects a least one entry from a list and send a low battery warning message to each selected entry.

BRIEF DESCRIPTION OF THE SEVERAL VIEWS OF THE DRAWINGS

FIG. 3 illustrates the structure of one embodiment of a subscriber profile;

FIG. 4 illustrates the type of information that might be included in each notification entry in a subscriber profile;

DETAILED DESCRIPTION OF THE INVENTION

Figure 1:
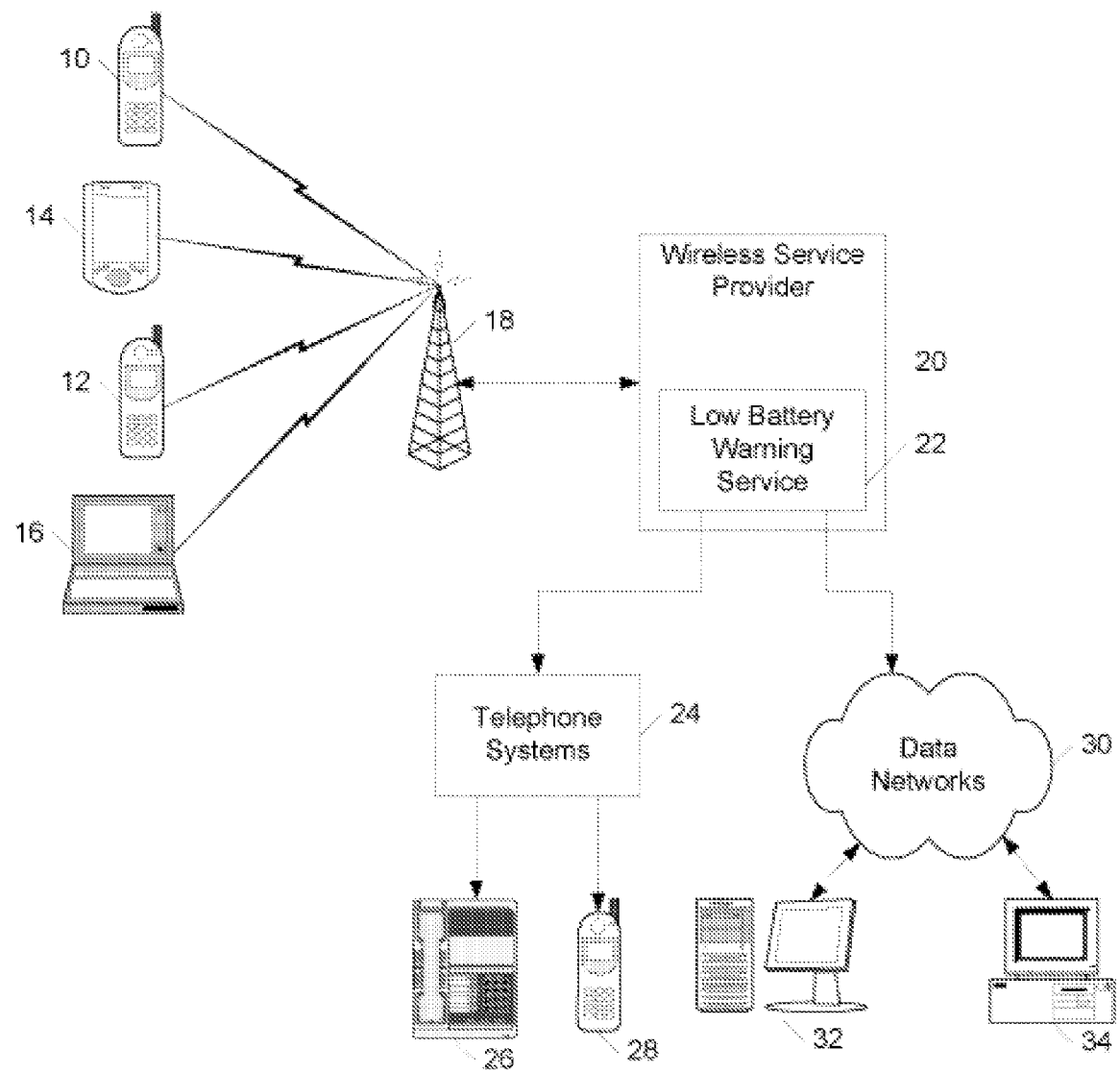
FIG. 1 is a high-level schematic illustration of a network in which the present invention is implemented.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a schematic illustration of a network that can be used to provide a low battery warning service to users of many different kinds of wireless devices, such as cellular telephones 10 and 12, personal digital assistant 14 and laptop computer 16. The service is, of course not limited, to the illustrated types of devices but can extend to converged combinations of such devices (e.g., so-called smart phones) or entirely different kinds of devices as long as those devices include low battery voltage detectors and the capability of transmitting a low battery condition message through a wireless network (shown generically as a single radio antenna 18) to a wireless service provider 20. The wireless service provider receives low battery condition messages and forwards them to a low battery warning service 22.

Details of the low battery warning service 22 are provided below. Generally speaking, the low battery warning service receives each low battery condition message and associates that message with a subscriber profile set up at the warning service server by a service subscriber. The subscriber profile includes a notification list having at least one notification address for each wireless device that subscribes to the warning service. When a low battery condition message is received from the subscribed wireless device, a notification address is selected from the notification list and an appropriate low battery warning message is transmitted to the selected notification address.

The term notification address is intended to be construed broadly enough to represent a network address or telephone number that can be associated with any device that can receive some form of a low battery warning message. For example, any telephone, such as a desktop telephone 26 or a cellular telephone 28, inherently possesses a unique notification address in the form of a conventional telephone number and thus can receive low battery warning messages (either as voice or text) through conventional telephone systems 24. Moreover, network-connected computers, such as desktop computers 32 and 34, also have notification addresses in the form of unique network addresses and can receive low battery warning messages through a network 30 in the form of e-mails, instant messages, or other warning messages that may pop up on the computer's display screen.

At least some of the devices to which warning messages may be sent by the warning service can be expected to be owned or controlled by the user of the wireless device to which the warning message applies. For example, a cell phone user who wishes to receive warning messages for a low battery condition at the cell phone may elect to have a low battery warning message sent to a desktop office phone, to an office computer, to a home phone and/or even to the cell phone itself on the theory the user will be more likely to notice a regular ring signal generated by the cell phone than a low battery audible warning generated by the same phone. Of course, the user may elect to have low battery warning messages directed to other people, such as an administrative assistant, spouse or parent, who is likely to know of the user's whereabouts and thus be able to pass on the low battery warning.

Figure 2:
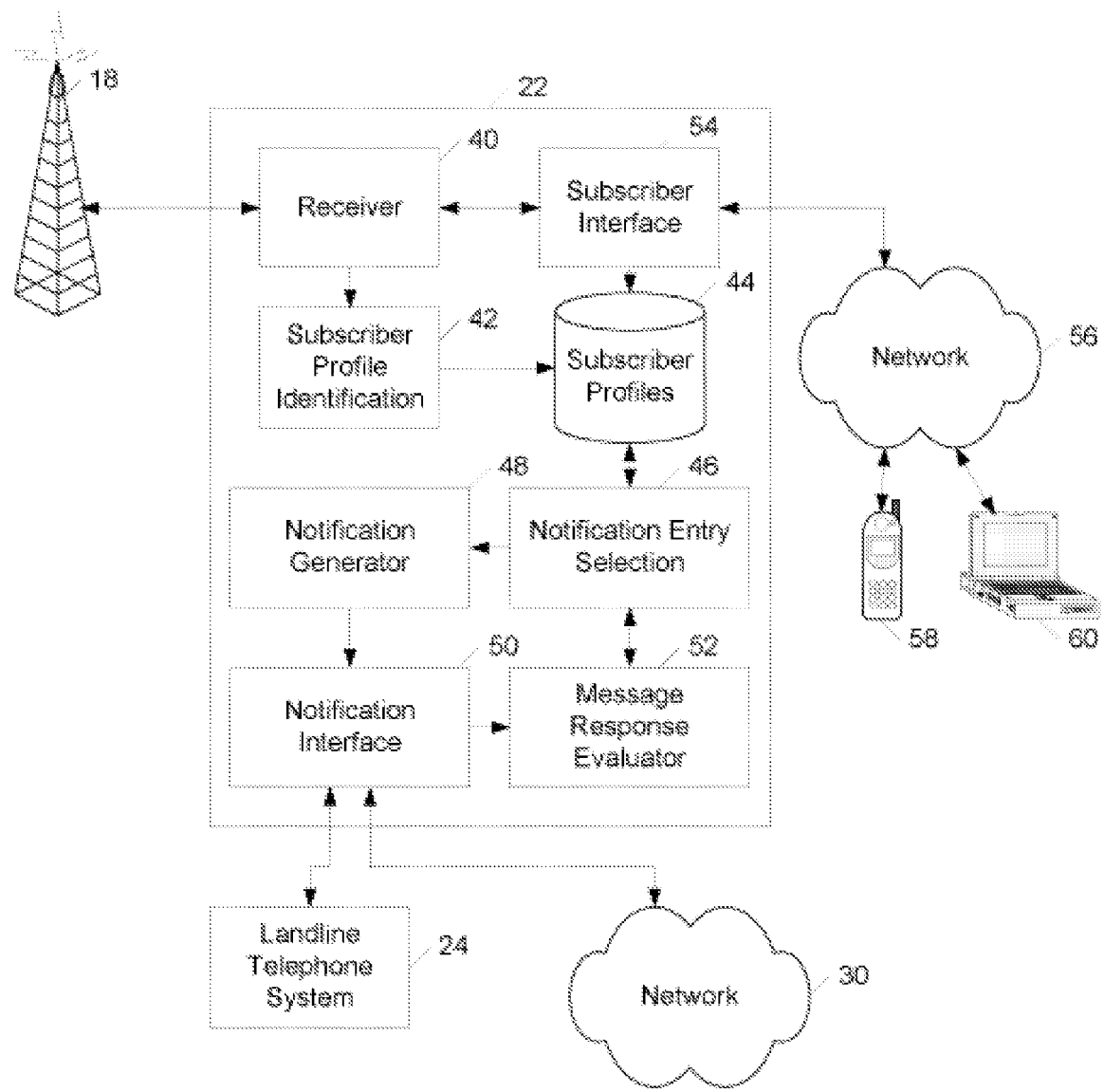
FIG. 2 is a schematic illustration that includes additional details of an apparatus for implementing the present invention.

FIG. 2 is a more detailed representation of the functional elements of one embodiment of the low battery warning service. For the sake of simplicity, the low battery warning service 22 is shown as receiving low battery condition messages directly from the radio antenna 18 supporting wireless devices (omitted from this drawing). A low battery condition message is received at a receiving component 40 capable of discriminating between such a message and other more conventional forms of device signals. If a low battery condition message is detected, the message is passed on to a subscriber profile identification circuit 42 capable of parsing the message to find a wireless device identifier that can be associated to a particular subscriber profile maintained in a subscriber profile database 44. The properties of the wireless device identifier can vary, depending on the type of wireless device. For cellular phones, the wireless device identifier may be an ESN (Electronic Serial Number) embedded in the phone by its manufacturer or a MIN (Mobile Identification Number) that uniquely identifies a mobile unit within a wireless carrier's network. For laptop or palmtop computers, the wireless device identifier may be a globally unique network address, such as a hardware-defined MAC (Media Access Control) address associated with the computer. Other forms of device identifiers can be used as long as those identifiers uniquely identify a particular wireless device that is subscribed to the low battery warning service.

As noted above, each stored subscriber profile associated with a wireless device identifier includes a notification list containing one or more addresses of devices to which low battery warning messages may be sent. One or more of these addresses, selected by a notification entry selection component 46, are forwarded to a notification generator component 48. The component 48 generates a warning message in a format appropriate to the type of device to which the message is to be sent. For example, if the warning message is being sent to a telephone, the message may include a prerecorded voice warning message into which synthesized voice may be inserted to identify the particular subscriber or wireless device that is the subject of the message. If the intended recipient of the message is someone other than the user of the wireless device, prerecorded or synthesized voice instructions for contacting the user might be included in the message. If the message is being sent to a computer system, a text equivalent of the above could be included in the message. The generated low battery warning message is passed through a notification interface component 50 on its way to communications networks such as telephone systems 24 or data network 30.

In a preferred embodiment, the notification interface 50 is a two-way system that both sends low battery warning messages and receives responses from the target devices to which the warning messages are sent. The responses can take different forms, depending perhaps on subscriber preferences set forth in the stored profiles. A profile may only require a passive response; e.g., the detection of an offhook signal at a telephone to which a warning message is sent or the acceptance of the warning message by a server supporting a computer user to whom a warning message is sent. Alternatively, a profile may require a more active response; e.g., a specific keypress signal returned from a telephone to which the warning message was sent or a specified acknowledgement action by a user of a computer to which the warning message was sent. Each response from a target system, returned through notification interface 50, is evaluated in a message response evaluator component 52 to determine whether the response satisfies predetermined response criteria originally stored in the retrieved subscriber profile. If the response fails to satisfy the predetermined criteria, the notification entry selection component 46 can choose one or more additional entries on the notification list associated with the subscriber profile and send out one or more additional warning messages to newly selected target systems.

While subscriber profiles are stored and utilized by the low battery warning service 22, the contents of those profiles must at least initially be established by or at least on the behalf of the subscriber to the low battery warning service. To this end, the service 22 preferably includes a subscriber interface component 54 that can be used to receive subscriber inputs from devices such as telephone 58 and computer 60 through an intervening network 56. In a preferred embodiment, the subscriber interface 54 may take the form of a web application that the subscriber can access from a suitable computer anywhere in the world through a public network such as the Internet.

FIG. 3 is a representation of one form of data structure that may be used for subscriber profiles. The data structure includes a wireless device identifier field 62 associated with a data field 64 in which the actual device identifier parameter is stored, a subscriber identifier field 66 identifying the subscriber to the low battery warning service for the identified wireless device and an associated data field 68 for the actual subscriber data. The data structure also includes one or more notification entries 76a-76n (each associated with a corresponding data storage location 78a-78n and identifying a target device to which some form of low battery warning message can be sent.

In one embodiment, the subscriber profile includes one or more "override" fields that are used to define conditions under which certain of the notification entries will be used or ignored. FIG. 3 shows a first field 70 for identifying a first set of override conditions, the data for which is stored in a corresponding data field 72 as well as a second field 74 for identifying a second set of override conditions, the data for which is stored in a corresponding data field 75. The purpose of the override condition fields is to enable the subscriber to readily establish one or more alternative lists of target systems to which low battery warning messages whenever specific conditions are found to exist. For example, if a subscriber plans to be on a business trip during the second week of a particular month, the subscriber can establish override conditions which will cause warning messages generated during that time to be sent only to notification addresses associated with the trip destination or destinations.

A possible data structure for each of the notification entries stored in the subscriber profile is shown in FIG. 4. The first field 80 in the illustrated data structure is a priority value that is used in establishing the order in which entries are considered. A second field 82 indicates whether the entry is an override entry that is to be called only if a flag field 84 indicates that applicable override conditions exist. Each notification entry preferably also includes a day of week restrictions field 86 and a time of day restrictions field 88 that further refine conditions under which a particular entry may be used. For example, the day of week field 86 may indicate a low battery warning message should be sent using the entry only during the work week and not on weekends or holidays. Similarly, the time of day field 88 may indicate a low battery warning message should be sent using the entry only between certain hours of the day; e.g., between 9:00 AM and 5:00 PM.

Each notification entry may also contain a field 90 containing a value that indicates whether the entry represents an address that is a member of a group and a field 82 containing a group ID value that can be used to identify other members of the same group. If a group member entry is selected, the group ID is used to retrieve all other members of the group so the low battery warning message may be sent concurrently to all members of the group.

Each notification entry includes, of course, a field 94 containing the address of the target device to which the warning message is to be sent and may include a field 96 for personalized content to be included in the warning message directed to that device. Personalized content includes, at a minimum, information identifying the wireless device to which the message pertains and may include personalized instructions for the person expected to receive the warning message at the identified target device. Finally, each entry preferably contains a field 98 that defines what will be considered to be an acceptable response to the low battery warning message from the specified target device.

In a preferred embodiment, the entries in a subscriber profile are considered in order of priority but low battery warning messages are sent only to active entries; that is, entries that are always used without regard to existing conditions or entries that are called only after it is determined that a specified set of override, day of week and time of day conditions are satisfied. If a selected entry identifies an address that is not a member of a group, the low battery warning message is sent to the single address. If the selected entry identifies an address that is a member of the group, the warning message is sent concurrently to all addresses in the group.

Each response to a warning message is evaluated to determine whether it satisfies the response criteria set forth in the relevant entry in the subscriber profile. If at least one satisfactory response is received, no further warning messages are sent. If no satisfactory response is received, the entry having the next highest priority value is retrieved and the described process is repeated. The process is reiterated until a satisfactory response is received from a target system to which a low battery warning message has been sent or the notification list stored in the subscriber profile is exhausted.

Figure 5:
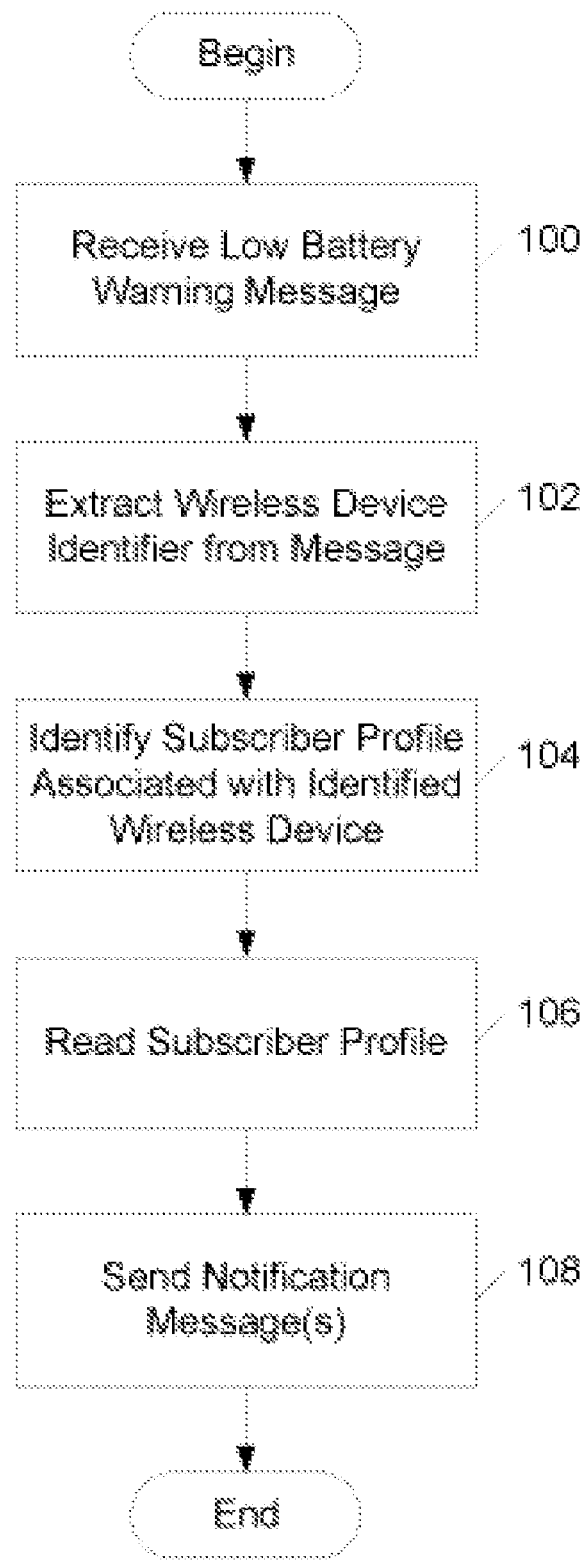
FIG. 5 is a high-level flow chart of basic operations performed by the present invention.

FIG. 5 is a flow chart of basic operations performed by the low battery warning service. When the service receives a low battery warning message in an operation 100, the identifier for the wireless device to which that message pertains is extracted in an operation 102. The extracted wireless device identifier is used in an operation 104 to identify a stored subscriber profile associated with the wireless device. The subscriber profile is retrieved and read in an operation 106 to obtain one or more notification addresses to which a warning message is to be sent. The operation of sending low battery condition notification messages is shown as a single operation 108 but is, in reality, a much more complex operation.

Figure 6A:
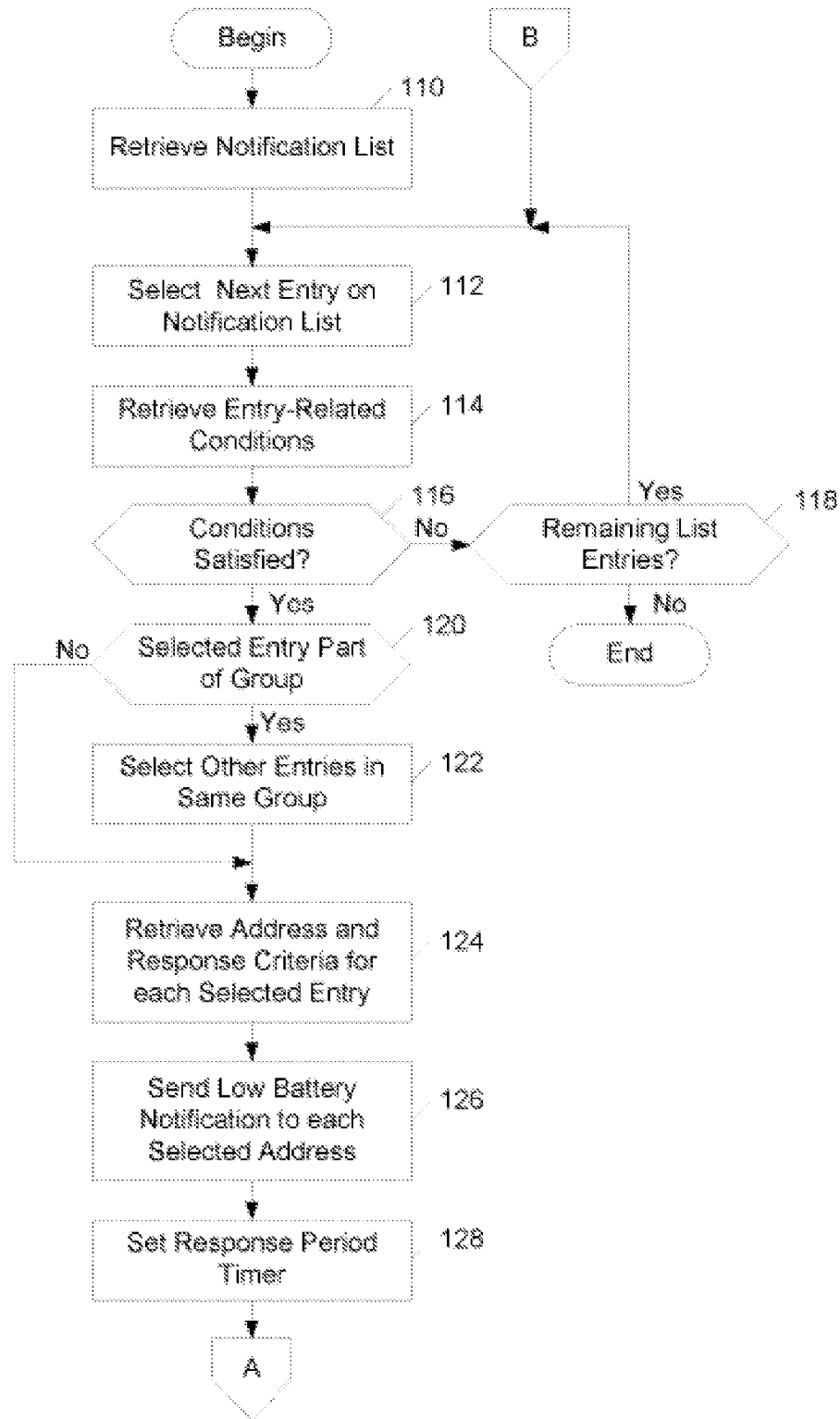
FIG. 6, consisting of FIGS. 6A and 6B, taken together, is a more detailed flowchart of the operations carried out in generating low battery warning messages and processing responses to those messages.
Figure 6B:
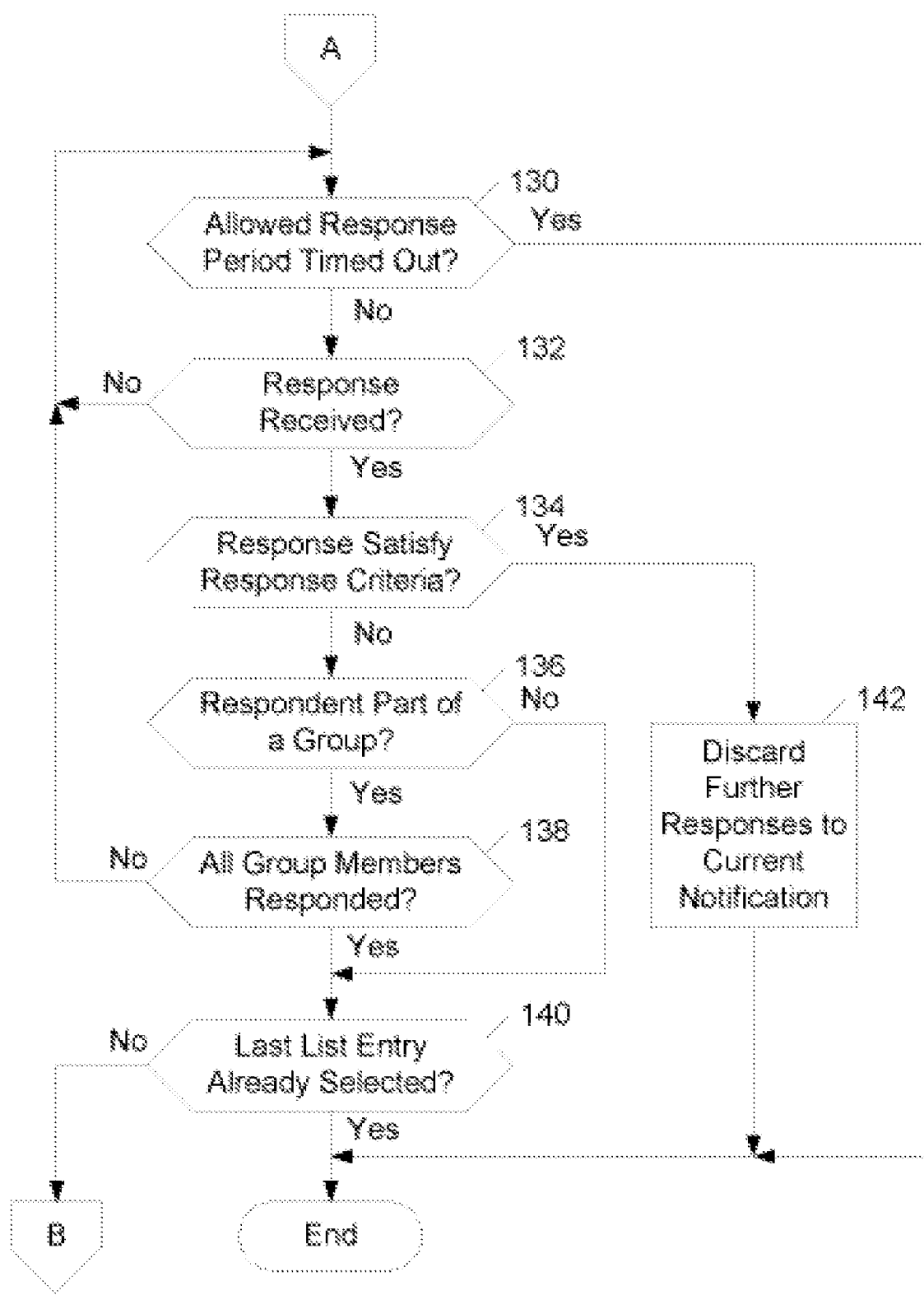

FIG. 6, consisting of FIGS. 6A and 6B, taken together, it is a more realistic representation of steps that are taken in sending low battery warning messages to target systems, receiving responses to those messages, and acting on those responses. The initial step 110 in the process is to retrieve the notification list contained in the subscriber profile associated with the wireless device from which a low battery notification message has been received. The highest priority unprocessed entry on that list is selected in operation 112. During the first iteration of the process, the highest priority unprocessed entry is, of course, the highest priority entry on the entire list. Any conditions of use associated with the selected entry are retrieved in operation 114 and evaluated. If an operation 116 determines the conditions of use are not satisfied, a check 118 is made to determine whether there are unprocessed entries remaining on the notification list. If at least one unprocessed entry remains, that entry is selected and processed by repeating operations 112, 114 and 116. If check 118 finds that all entries on the list have been processed, the warning service process is terminated.

Once a notification list entry is retrieved and found to satisfy any applicable conditions of use, an operation 120 determines whether that entry is part of a group. If the entry is part of a group, other entries in the same group are selected in operation 122. In one embodiment of the invention, any test for conditions of use is suspended for grouped entries as it is assumed the tests conducted for the initial entry will apply to all other members of the same group.

If a selected entry is not part of a group, operation 122 is bypassed. The address and response criteria for each selected entry, which may be a single entry, is retrieved in operation 124 and an appropriated formatted low battery warning message is sent to each selected address in operation 126. A response timer is set in operation 128 to limit how long the system will wait for responses from the target systems. The notification system then goes into a wait mode during which periodic checks are made (in operation 130) as to whether the allowed response period has timed out. If the allowed response period has not timed out, which it obviously will not have on the first iteration of the process, a check 132 is made to determine whether or not a response to the warning message has been received. If no response has been received, the program enters a loop consisting of operations 130 and 132 and remains in that loop until one of two things happens. If the allowed response period times out without a response having been received, program control returns to operation 112 where the next unprocessed entry on the notification list the selected and previously described operations for repeated for newly selected entry.

If, however, operation 132 indicates that a response was received from a target system, a determination 134 is made as to whether that response satisfies criteria defined in the subscriber profile. If the determination 134 shows that the response fails to satisfy the defined criteria, a check 136 is made to determine whether the target system is part of a defined group to which concurrent low battery warning messages were sent. If the responding system is part of a group, a subsequent check 138 is made to determine whether all members of the group have responded. At least one member of the group has yet to respond, program control is returned to the input of operation 130, to return the system to a wait mode during which one or more currently missing group members may respond before the allowed response period times out. If operation 136 had shown that the target system was not part of a group (meaning the low battery warning message went to a single target) or if operation 138 had shown that the target system was part of a group but that all members of the group had already responded (without any of the responses being deemed satisfactory), an operation 140 is triggered to determine whether the last entry in the notification list has already been processed. If the last entry on the notification list has been processed, the warning service process ends. If the last entry has yet to be processed, program control returns to operation 112, which will cause the next unprocessed entry on the notification list to be selected.

If a response tested in operation 134 is found to satisfy defined criteria, a flag is set in an operation 142 to cause any further responses to the current notification or notifications to be ignored and the warning service process is ended since a single satisfactory response is considered an acceptable process outcome.

Figure 7:
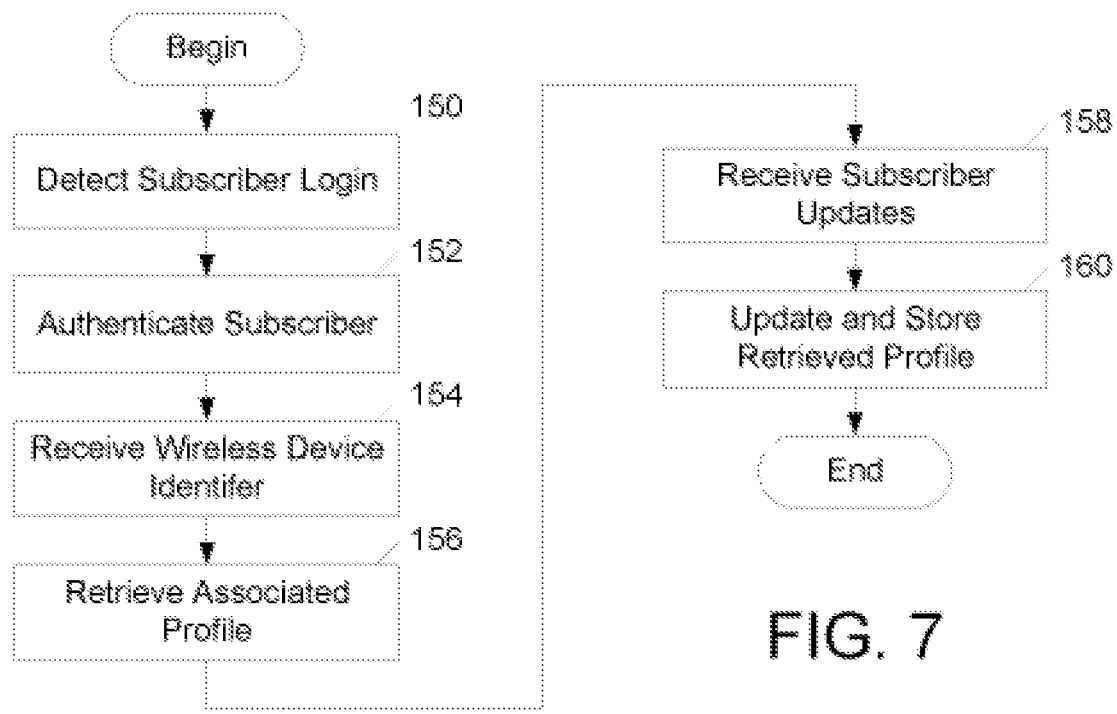
FIG. 7 is a flow chart of basic operations performed by subscriber when updating a stored subscriber profile.

As noted earlier, a subscriber can establish and update the subscriber profile or profiles maintained by the warning service provider. FIG. 7 is a flow chart of the basic steps performed by the warning service when a subscriber wishes to establish a new profile or change an existing profile. Once the subscriber login is detected in operation 150, the subscriber is authenticated in an operation 152 and the identity of the wireless device to which the profile change is to apply is established in an operation 154. Once the wireless device identifier is established, the associated subscriber profile is retrieved from the profile database in operation 156, subscriber updates are received in operation 158 and the profile is updated and returned to the database in an operation 160.

Figure 8:
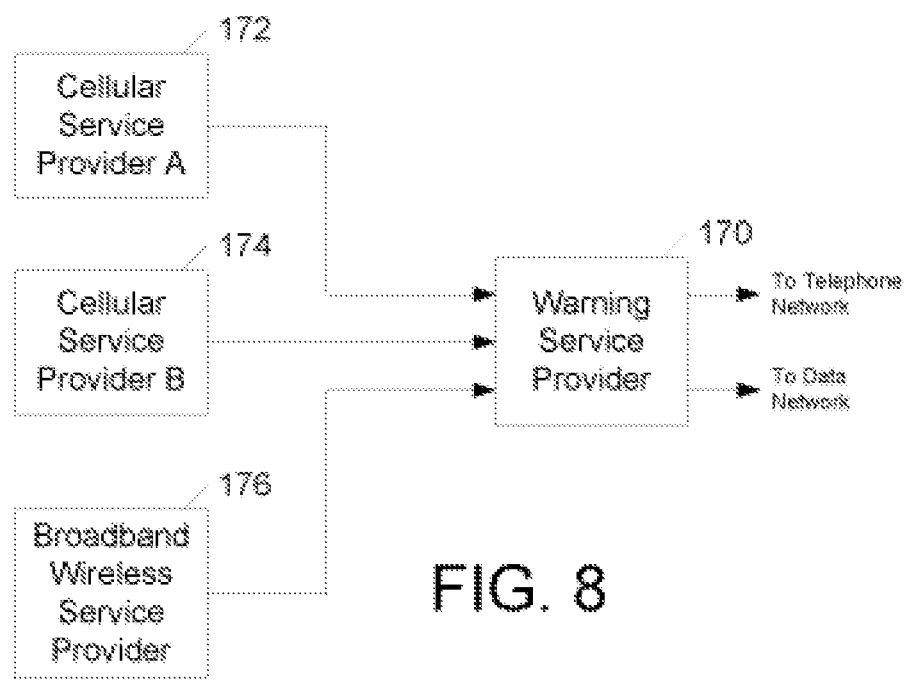
FIG. 8 is a high-level system view of an alternative embodiment of the present invention.

An assumption has been made to this point with the low battery warning service is provided by the same service provider that directly supports wireless operations of wireless device being monitored. FIG. 8 illustrates an alternate embodiment in which a warning service provider 170 is an independent entity that does not provide services directly to wireless devices but instead operates as a contractor for wireless service providers such as cellular service providers 172 and 174 and broadband service provider 176. Each of these service providers may receive a low battery notification from any of its subscribers to whom warning services are provided and pass that notification directly to warning service provider 170, who assumes all responsibility for processing the low battery notifications, sending warning messages, maintaining subscriber profiles, etc. One advantage of this arrangement is that each wireless service provider is not expected to provide services for wireless devices outside of its primary scope of business; e.g., a cellular phone service provider is not expected to provide low battery warning services for laptop or palmtop computer users or a broadband service provider is not expected to provide low battery warning services for cell phone users.

Figure 9:
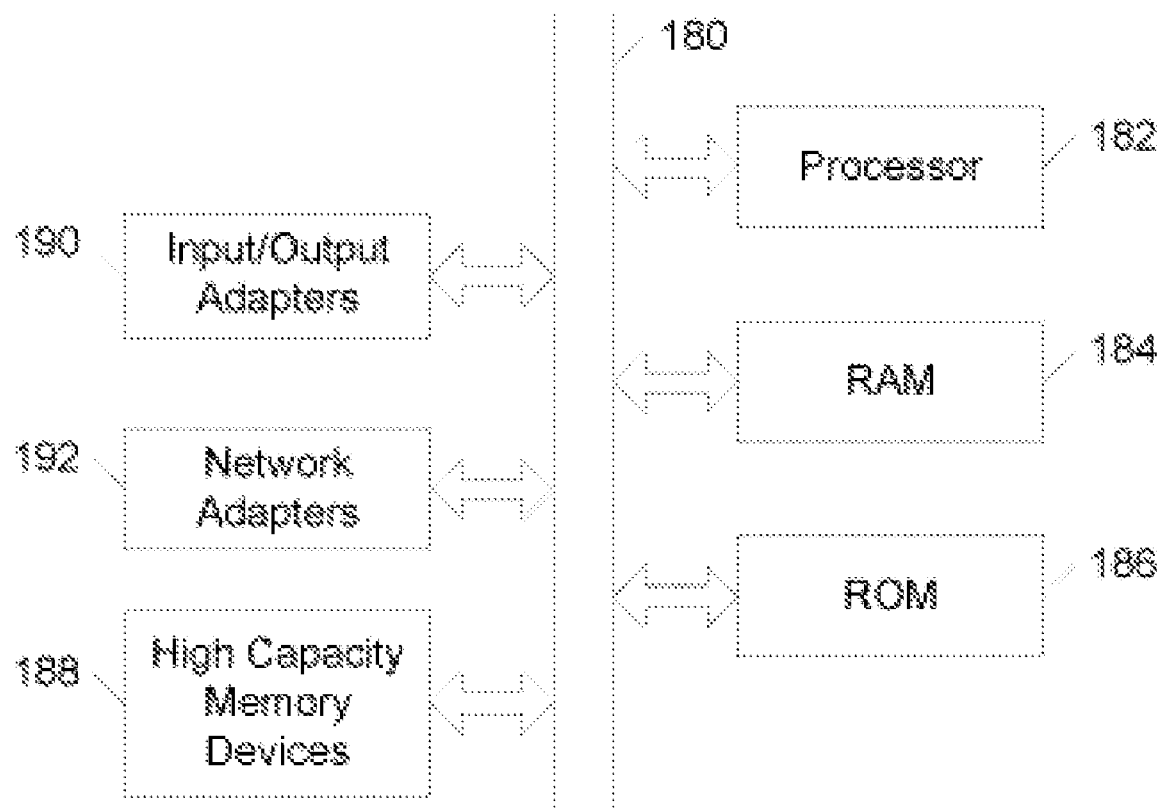
FIG. 9 is a block diagram of the functional infrastructure of a general purpose programmable computer system that could be used in implementing the present invention.

FIG. 9 is a functional block diagram showing the major elements of a programmable general purpose computer system that can be used to provide the low battery warning service described above. The infrastructure includes a system bus 180 that carries information and data among a plurality of hardware subsystems including a processor 182 used to execute program instructions received from computer applications running on the hardware. The infrastructure also includes random access memory (RAM) 184 that provides temporary storage for program instructions and data during execution of computer applications and a read only memory (ROM) 186 often used to store program instructions required for proper operation of the device itself, as opposed to execution of computer applications. Long-term storage of programs and data is provided by high-capacity memory devices 188, such as magnetic hard drives or optical CD or DVD drives.

Such drives provide non-volatile storage for applications and processes that execute in the computer system and for data used in and/or generated by those applications and processes. Depending on the technology employed, the drives may include removable media. The special purpose programming needed by a computer system to implement the described invention would typically be stored in one of these drives and transferred as needed into RAM 184. Local drives, such as those discussed above, may be supplemented by network-accessible drives.

In a typical computer system, a considerable number of input/output devices are connected to the system bus 180 through input/output adapters 190. Commonly used input/output devices include monitors, keyboards, pointing devices and printers. Increasingly, high capacity memory devices are being connected to the system through what might be described as general-purpose input/output adapters, such as USB or FireWire adapters. Finally, the system includes one or more network adapters 192 that are used to connect the system to other computer systems through intervening computer networks.

It should not be inferred that only the devices shown in the drawing or discussed above can be part of the computer system. There are simply too many different types of devices to include in a drawing. Moreover, it should not be implied that the input/output adapters or general use adapters are limited to the technologies mentioned. There are too many different types of device adapters to include all in the drawing. Current examples of port technologies that are successfully used include not only USB, but also serial ports, parallel ports, SCSI, FireWire ports and infrared ports. Other port technologies undoubtedly already exist or will be developed.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A method of providing a low battery notification service to users of battery-powered wireless devices, said method being performed in a notification server and comprising:
    a) receiving a low battery warning message from a remote wireless device, said warning message including a wireless device identifier for said remote wireless device;
    b) retrieving a notification list associated with the wireless device identifier, said notification list including a plurality of notification addresses;
    c) selecting at least one notification address from said notification list;
    d) sending a low battery notification message to each selected notification address;
    e) receiving a response to a sent low battery notification message;
    f) determining whether said response satisfies predetermined criteria;

g) in response to a determination that said response fails to satisfy the predetermined criteria, repeating operations c), d), e) and f) until it is determined that at least one received response satisfies the predetermined criteria or until the notification list has been exhausted, whichever is first to occur.

2. A method according to claim 1 wherein sending a low battery notification message to a least one notification address on said retrieved notification list further comprises sending low battery notification messages concurrently to a plurality of notification addresses on said notification list.

3. A method according to claim 2 further comprising:
determining whether a response to any concurrently sent low battery notification message satisfies predetermined criteria, and
in response to a determination that no response satisfies predetermined criteria, selecting at least one new notification address from said notification list and sending a low battery notification message to each selected new notification address.

4. A method according to claim 1 wherein selecting at least one notification address from said notification list further comprises selecting said at least one notification address in accordance with preferences included in said notification list.

5. A method according to claim 1 wherein selecting at least one notification address from said notification list further comprises selecting said at least one notification address based on an external condition.

6. A computer program product for providing a low battery notification service to users of battery-powered wireless devices, said computer program product comprising a non-transitory computer usable medium having computer usable program code embodied therewith, said computer usable program code being executable within a notification server and comprising:
computer usable program code configured to receive a low battery warning message from a remote wireless device, said warning message including a wireless device identifier for said wireless device;
computer usable program code configured to retrieve a notification list associated with the wireless device identifier, said notification list including a plurality of notification addresses;
computer usable program code configured to select at least one notification address from said notification list;
computer usable program code configured to send a low battery notification message to each selected notification address
computer usable program code configured to receive a response to a sent low battery notification message;
computer usable program code configured to determine whether said response satisfies predetermined criteria; and
computer usable program code configured to repeat the operations of selecting at least one notification address from said notification list, sending a low battery notification message to each selected notification address, receiving a response to a sent low battery notification message and determining whether said response satisfies predetermined criteria until is determined that at least one received response satisfies the predetermined criteria or until the notification list has been exhausted, whichever is first to occur.

7. A computer program product according to claim 6 wherein the computer usable program code configured to send a low battery notification message to each selected notification address further comprises computer usable program code configured to send low battery notification messages concurrently to a plurality of notification addresses on said notification list.

8. A computer program product according to claim 7 further comprising:
computer usable program code configured to determine whether a response to any concurrently sent low battery notification message satisfies predetermined criteria; and
computer usable program code configured to, in response to a determination that no response satisfies predetermined criteria, select at least one new notification address from said notification list and sending a low battery notification message to each selected new notification address.

9. A computer program product according to claim 6 wherein the computer usable program code configured to select at least one notification address from said notification list further comprises computer usable program code configured to select at least one notification address in accordance with preferences included in said notification list.

10. A computer program product according to claim 6 wherein the computer usable program code configured to select at least one notification address from said notification list further comprises computer usable program code configured to select at least one notification address based on an external condition.

11. A notification server apparatus for providing a low battery notification service to users of battery-powered wireless devices comprising:
a subscriber profile data store for storing subscriber profiles comprising notification lists, each of said lists being associated with a wireless device and including a plurality of notification addresses;
a receiving component for receiving a low battery warning message from a remote wireless device, said warning message including a wireless device identifier for said wireless device;
profile identification logic for identifying a stored subscriber profile associated with the wireless device identified in the low battery warning message;
access control logic for reading the notification list stored in the identified stored subscriber profile;
notification control logic for selecting at least one entry on the read notification list and for sending a low battery notification message to each selected entry; and
response handling logic for receiving responses to sent low battery notification messages and determining whether a received response satisfies predetermined criteria; and, in response to a determination that the received response fails to satisfy the predetermined criteria, selecting at least one new notification address from said notification list and sending a low battery notification message to each selected new notification address, and for repeating the operations of determining whether the response to the low battery notification message satisfies predetermined criteria and in response to a determination that the response fails to satisfy the predetermined criteria, selecting at least one new notification address from said notification list and sending a low battery notification message to each selected new notification address, until a received response satisfies predetermined criteria or the notification list has been exhausted, whichever is first to occur.

12. A notification server apparatus according to claim 11 wherein the notification control logic for selecting at least one entry on the read notification list and for sending a low battery notification message to each selected entry further comprises logic for sending low battery notification messages concurrently to a plurality of notification addresses on said notification list.

13. A notification server apparatus according to claim 12 wherein the response handling logic further comprises:
   logic for determining whether a response to any concurrently sent low battery notification message satisfies predetermined criteria, and
   logic for, in response to a determination that no response satisfies predetermined criteria, enabling said access control logic to select at least one new notification address from said notification list and enabling said notification control logic to send a low battery notification message to each selected new notification address.

14. A notification server apparatus according to claim 13 wherein said access control logic for reading the notification list stored in the identified stored subscriber file further comprises logic for selecting said at least one notification address in accordance with preferences included in said notification list.

* * * * *